(12) United States Patent
Shah et al.

(10) Patent No.: US 8,701,205 B2
(45) Date of Patent: Apr. 15, 2014

(54) VALIDATION AND/OR AUTHENTICATION OF A DEVICE FOR COMMUNICATION WITH NETWORK

(75) Inventors: Yogendra C. Shah, Exton, PA (US); Inhyok Cha, Yardley, PA (US); Andreas Schmidt, Frankfurt am Main (DE); Andreas Leicher, Frankfurt am Main (DE); Joseph Gredone, Chalfont, PA (US); Samian Kaur, Plymouth Meeting, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 418 days.

(21) Appl. No.: 12/760,690

(22) Filed: Apr. 15, 2010

(65) Prior Publication Data

US 2011/0099361 A1     Apr. 28, 2011

Related U.S. Application Data

(60) Provisional application No. 61/169,630, filed on Apr. 15, 2009, provisional application No. 61/253,687, filed on Oct. 21, 2009, provisional application No. 61/222,067, filed on Jun. 30, 2009.

(51) Int. Cl.
  *G06F 21/02*     (2006.01)
  *G06F 7/04*      (2006.01)
  *H04L 9/00*      (2006.01)

(52) U.S. Cl.
  USPC ............. 726/27; 713/156; 713/166; 713/175; 726/2

(58) Field of Classification Search
  None
  See application file for complete search history.

(56) References Cited

U.S. PATENT DOCUMENTS

| | | | |
|---|---|---|---|
| 7,318,150 B2 * | 1/2008 | Zimmer et al. | 713/2 |
| 7,784,089 B2 | 8/2010 | Lundblade et al. | |
| 7,818,585 B2 | 10/2010 | Kilian-Kehr et al. | |
| 8,255,977 B2 * | 8/2012 | Xiao et al. | 726/3 |
| 8,286,221 B2 | 10/2012 | Muller et al. | |
| 8,320,880 B2 | 11/2012 | Fok et al. | |
| 8,370,614 B2 * | 2/2013 | Dalton et al. | 713/2 |
| 8,438,658 B2 * | 5/2013 | Hofstee et al. | 726/30 |

(Continued)

FOREIGN PATENT DOCUMENTS

| | | | | |
|---|---|---|---|---|
| CN | 1808455 A | 7/2006 | | |
| EP | 2 107 756 A1 * | 7/2009 | | H04L 29/06 |

(Continued)

OTHER PUBLICATIONS

International Patent Application No. PCT/US2010/031226, International Search Report dated Sep. 2, 2010, 14 pages.

(Continued)

*Primary Examiner* — Christopher Revak
(74) *Attorney, Agent, or Firm* — Baker & Hostetler LLP

(57) ABSTRACT

A device may include a trusted component. The trusted component may be verified by a trusted third party and may have a certificate of verification stored therein based on the verification by the trusted third party. The trusted component may include a root of trust that may provide secure code and data storage and secure application execution. The root of trust may also be configured to verify an integrity of the trusted component via a secure boot and to prevent access to the certain information in the device if the integrity of the trusted component may not be verified.

13 Claims, 12 Drawing Sheets

(56) References Cited

U.S. PATENT DOCUMENTS

| | | | |
|---|---|---|---|
| 2007/0016766 A1* | 1/2007 | Richmond et al. | 713/100 |
| 2007/0256125 A1 | 11/2007 | Chen et al. | |
| 2009/0013406 A1* | 1/2009 | Cabuk et al. | 726/22 |
| 2009/0259854 A1* | 10/2009 | Cox et al. | 713/189 |
| 2009/0276617 A1* | 11/2009 | Grell et al. | 713/2 |
| 2010/0077454 A1* | 3/2010 | Xiao et al. | 726/3 |
| 2010/0251334 A1* | 9/2010 | Xiao et al. | 726/3 |
| 2010/0263023 A1* | 10/2010 | Xiao et al. | 726/3 |
| 2011/0119748 A1* | 5/2011 | Edwards et al. | 726/12 |
| 2012/0290870 A1* | 11/2012 | Shah et al. | 714/4.11 |
| 2013/0124840 A1* | 5/2013 | Diluoffo et al. | 713/2 |

FOREIGN PATENT DOCUMENTS

| | | |
|---|---|---|
| JP | 2003-501946 | 1/2003 |
| JP | 2006-179007 A | 7/2006 |
| JP | 2007-505582 | 3/2007 |
| JP | 2008-299457 A | 12/2008 |
| KR | 10-2007-0073943 | 7/2007 |
| KR | 10-2008-0065964 | 7/2008 |
| WO | WO 2010/121020 | 10/2010 |

OTHER PUBLICATIONS

TCG, "TCG Mobile Reference Architecture", Specification Version 1.0, Revision 1, TCG Online, Jun. 12, 2007, 87 pages.

TCG, "TCG Specification Architecture Overview", Specification Revision 1.2, TCG, Apr. 28, 2004, 54 pages.

Sachiko Yoshihama, "Platform Trust Based Access Control Framework," The 2006 Symposium on Cryptography and Information Security, 3B2 Access Control, 3B2-5, Planning Committee of the SCIS 2006, Hiroshima, Japan, Jan. 17-20, 2006, 10 pages.

"What is TCG's Trusted Network Connect," Network Access Control Interoperability Lab [online], 4 in a Series, [retrieved on Aug. 9, 2012]. Retrieved from the Internet, URL, <http://www.opus1.com/nac/teamwhitepapers/2008-04whatistcgt nc.pdf>, Apr. 29, 2007, 2 pages.

\* cited by examiner

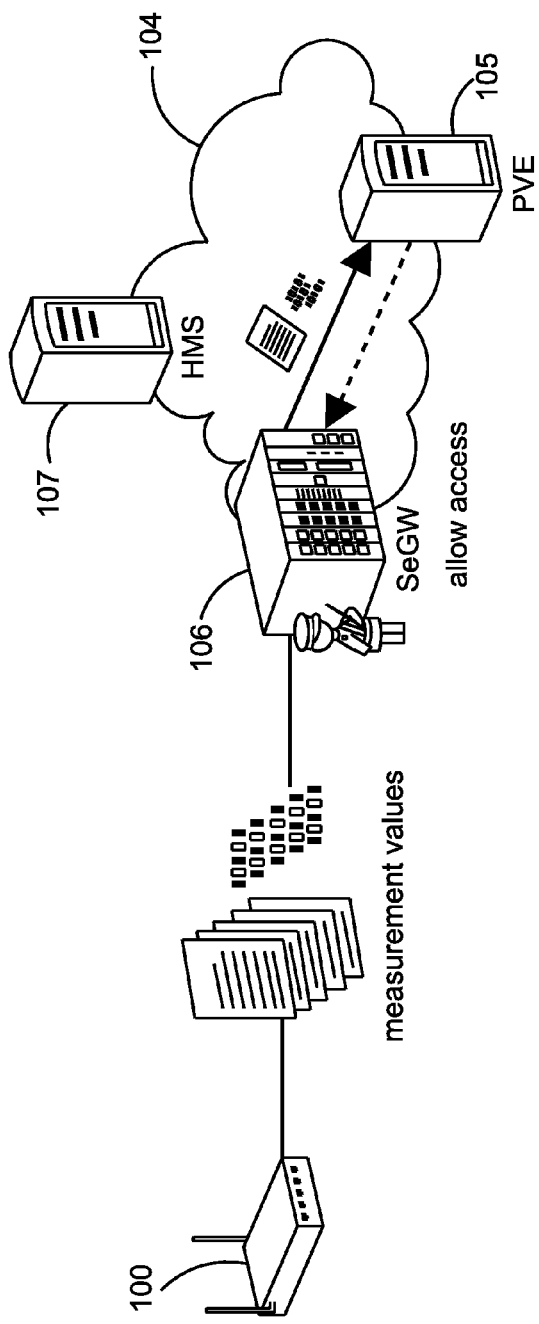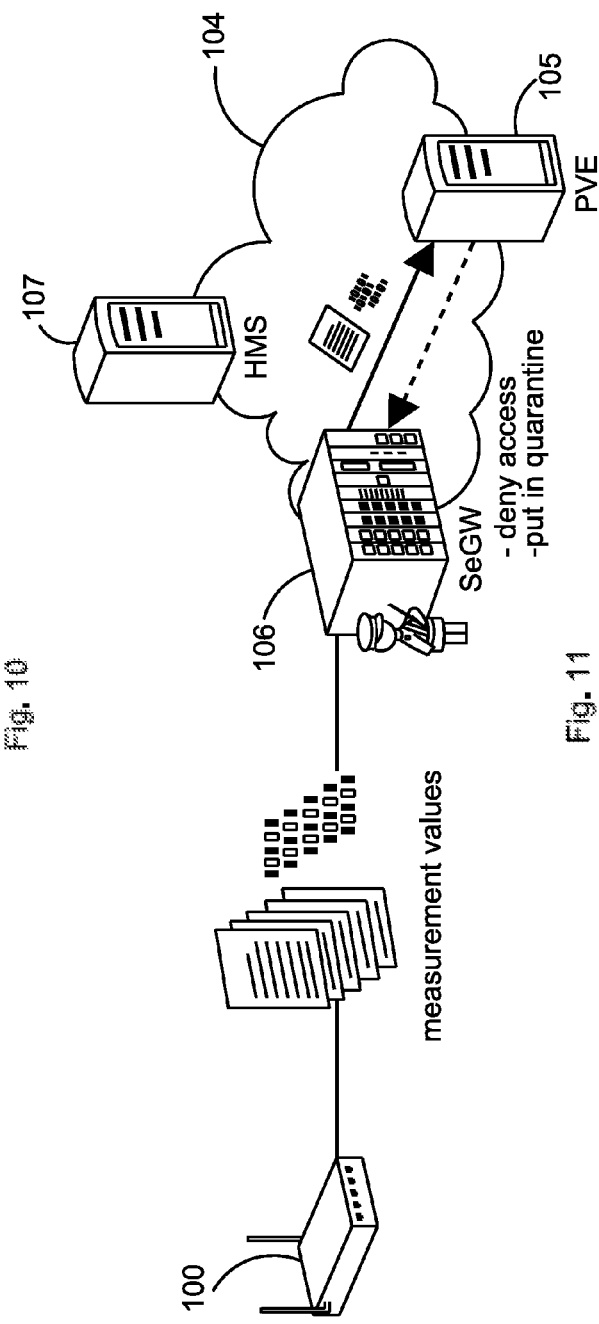

VALIDATION AND/OR AUTHENTICATION OF A DEVICE FOR COMMUNICATION WITH NETWORK

CROSS-REFERENCE TO RELATED APPLICATIONS

This application claims priority to U.S. Provisional Patent Application No. 61/253,687, filed on Oct. 21, 2009, and U.S. Patent Application No. 61/169,630, filed on Apr. 15, 2009, the disclosures of which are incorporated herein by reference. This application further claims priority to U.S. Provisional Patent Application No. 61/222,067, filed on Jun. 30, 2009.

BACKGROUND

Currently, devices such as mobile phones, femtocells, home nodes, cable modems, network access points, or the like may connect to a communication network. Via the connection, the devices may use the communication network to receive and/or place telephone calls, access the Internet, or the like. Unfortunately, such devices may not include systems or methods to validate an integrity of components that may be included in the devices, for example, before connecting to the network.

SUMMARY

Systems and methods for performing trusted computing may be provided. For example, a device such as a computing device, a mobile device, a femtocell, an access point base station, a home node such as an enhanced Home Node-B (H(e)NB), or the like may include a trusted component. The trusted component may be verified by a trusted third party and may have a certificate of verification stored therein based on the verification by the trusted third party.

According to an example embodiment, the trusted component may include a root of trust such as an immutable root of trust that may provide secure code and data storage and secure application execution. The root of trust may also be configured to verify an integrity of the trusted component, for example, via a secure boot such as a staged secure-start up. According to an example embodiment, the device may operate in accordance with a first policy when the integrity of the trusted component may not be verified by the root of trust and may operate in accordance with a second policy when the integrity of the trusted component may be verified. Thus, in an example embodiment, the trusted component may invoke secure start-up and run-time operations, including real-time integrity verification of the device, external entities, and communication links.

BRIEF DESCRIPTION OF THE DRAWINGS

FIGS. 10-11 illustrate example embodiments of remote validation of a device.

DETAILED DESCRIPTION OF ILLUSTRATIVE EMBODIMENTS

Figure 1:
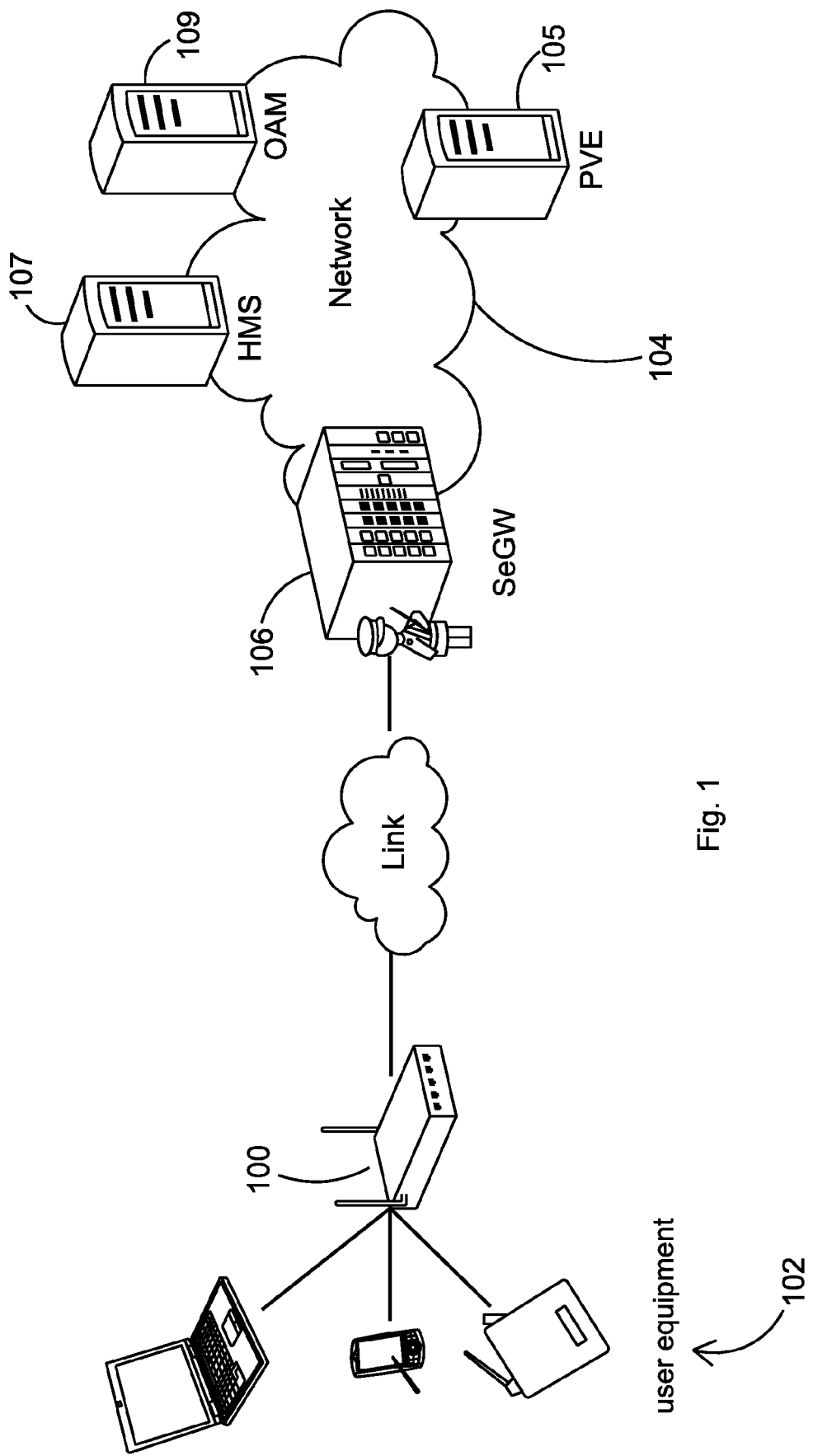
FIG. 1 illustrates an example embodiment of a device that may be used in wireless communications.

FIG. 1 depicts an example embodiment of a device 100 that may be used in wireless communications. According to example embodiments, the device 100 may be a computing device, a sensor node, a mobile device, femtocell, a access point base station, a home node such as an enhanced Home Node-B (H(e)NB), a base station, or any other suitable device that may access a network and/or extend service coverage such as cellular coverage where access may be limited or unavailable. As shown in FIG. 1, the device 100 may be in communication with one or more user devices 102 such as computing devices, cellular phones, Personal Data Assistants (PDAs), a sensor node, or the like.

The device 100 may also be in communication with an external communication entity, such as a network 104. According to one embodiment, the network 104 may be a broadband network such as a DSL network, a cable network, or the like. According to example embodiments, the external communication entity, such as network 104, may include a plurality of components including, a platform validation entity (PVE) 105, a security gateway (SeGW) 106, a home node management system (HMS) 107, and/or an operations and management (OAM) component 109. As shown in FIG. 1, the device 100 may be in communication with the network 104 via a security gateway (SeGW) 106 such that the device 100 may use the network 104 to initiate and/or establish wireless communication such as telephone calls, text messages, e-mail messages, data sessions such as communications via the Internet, or the like. For example, a user may interact with a user device 102 to initiate a wireless communication such as a telephone call with a recipient. When the user device 102 may be within a range of the device 100, the user device 102 may initiate the wireless communication with the recipient using the device 100. For example, the user device 102 may transmit or provide a request or information to initiate the wireless communication to the device 100. The device 100 may then transmit such a request or information to, for example, the network 104 such that a communication session such as a telephone call may be established between the user and the recipient.

According to example embodiments, an integrity of the device 100 including the components therein may be verified before the device 100 may be authenticated with the network 104, the user device 102, and/or another external communication entity such as a Universal Serial Bus (USB) connection, a Bluetooth connection, a fire wire connection, or the like. For example, the device 100 may be subject to various security flaws such as compromised credentials, physical attacks, configuration attacks, protocol attacks, network attacks, user data attacks, identity privacy attacks, radio resource management attacks, or the like. To prevent such security flaws from affecting, for example, the network 104, the user device 102, and/or another external communication entity, an integrity of the device 100 and the components therein may be verified to ensure that the device 100 and the components therein may not have been subject to security flaws or otherwise compromised from a trusted state.

Figure 2:
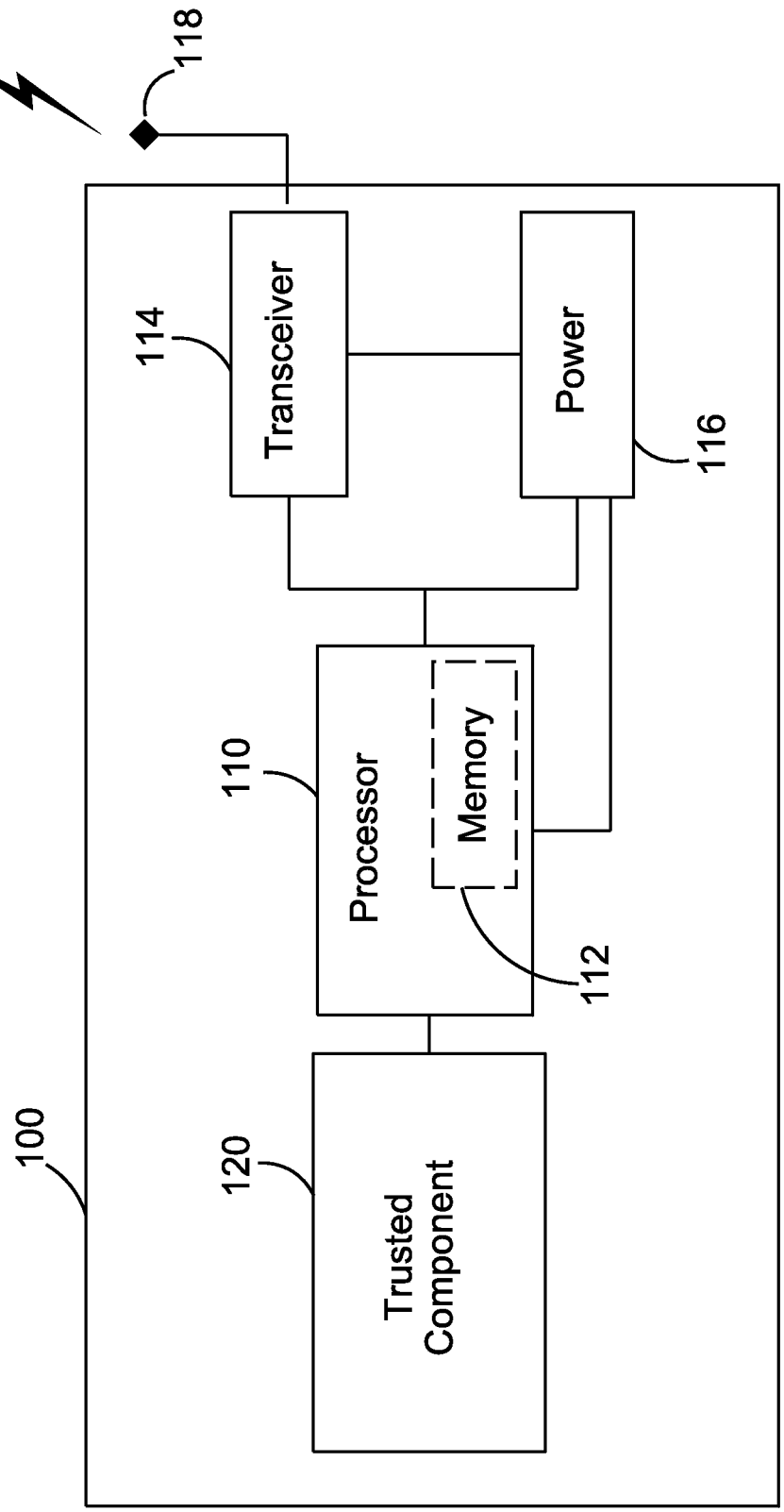
FIG. 2 illustrates an example embodiment of a device that may include a trusted component.

FIG. 2 depicts an example embodiment of the device 100 that may include a trusted component. As shown in FIG. 2, the device 100 may include a processor 110, memory 112, a transceiver 114, a power source 116, and an antenna 118.

The processor 110 may include a standardized processor, a specialized processor, a microprocessor, or the like that may execute instructions for performing trusted computing such as instructions for initiating, by a root of trust, a secure boot that may include loading and executing a trusted component; verifying the integrity of the trusted component; and operating in accordance with a particular policy depending on whether the integrity of the trusted component is verified. If the integrity of the trusted component 120 may not be verified, the policy by which the processor 110 operates may include preventing access to information such as credentials or certificates that may be required to authenticate the device 100 with an external communication entity such as the network 104. For example, the device 100 may use the credentials to authenticate with the external communication entity such as the network 104 using any suitable authentication technique including, without limitation, device authentication, certificate based authentication, or any EAP-AKA based authentication techniques.

As described above, the device 100 may further include memory 112. In one embodiment, the memory 112 may store instructions that may be executed by the processor 110, code, data, or any other suitable information. According to an example embodiment, the memory 112 may include random access memory (RAM), read only memory (ROM), cache, Flash memory, a hard disk, or any other suitable storage device. As shown in FIG. 2, in one embodiment, the memory component 112 may be integrated into the processor 110. According to another embodiment, the memory 112 may be a separate component in communication with the processor 110.

The device 100 may also include a transceiver 114 that may be in communication with the processor 112 and an antenna 118. According to an example embodiment, the transceiver 114 and the antenna 118 may facilitate a transmission and/or a reception of wireless communications such as telephone calls, text messages, e-mail messages, data sessions such as communications via the Internet or the like and/or wired communications.

As shown in FIG. 2, in one embodiment, the device may further include a power source 116. The power source 116 may be a battery power source, an AC/DC power source, an energy harvesting power source, or the like that may provide power to the device 100 including the components of the device 100. For example, the power source 116 may provide power to the processor 110, the memory 112, the transceiver, the antenna 118, or any other component such that the device 100 including the components therein may function as described herein.

As described above, the device 100 may also include the trusted component 120. According to an example embodiment, the trusted component 120 may be based on a chain of trust that may be anchored on a root of trust and that may provide a secure execution environment for low level and high level applications.

According to one embodiment, the trusted component 120 may load data and applications after an authenticity and integrity of a component may be checked. The trusted component 120 may further provide an execution environment in which loaded applications may be safe from tampering. In example embodiments, the trusted component 120 may be certified by a trusted third party such as, for example, the operator certification of a UMTS Identity Circuit Card (UICC), which will be described in more detail below. In addition, the trusted component 120 may indicate to a user that the device 100 may be trustworthy and a network operator or network may identify the device 100 as having a trusted component in a verifiable manner to establish a level of trust.

Each component including hardware and/or software of the trusted component 120 may be certified for security and trustworthiness. For example, the trusted component 120 may include a physical certification process and a security certificate that may be delivered with a platform design such that an authenticity of the trusted component 120 may be verified. In one embodiment, an incremental inclusion of such trusted hardware and/or software may be used to create a chain of trust of the trusted component 120, which will be described in more detail below.

Thus, according to example embodiments, the trusted component 120 may provide a measure of trust to users and operators that may be used to provide direct control over information such as identity and access controls as well as privacy controls. For example, the trusted component 120 may provide secure and reliable measurement, reporting, and verification of the trustworthiness of a device; secure and trusted operation of user applications; secure and trusted protection for the authenticity, confidentiality, integrity, availability, and privacy of data, such as an identity or virtual identity of a user; granular control of access to and dissemination of user information; or the like.

In one embodiment, the trusted component 120 may include a logically separate entity as well as a set of functions and resources within the device 100 such that the trusted component 120 may also provide integrity or trust state protection, secure storage of, for example, sensitive data, cryptography, time stamping, secure execution of software, or the like.

According to an example embodiment, the integrity or trust state protection that may be provided by the trusted component 120 may include trust state measurements, verification, and protection. For example, the trusted component 120 may provide enforcement of integrity policies, protection of the availability and integrity of hardware functions that may form the basis of security critical functions of the device 100, authentication of the device 100, verification of the trusted component 120 and/or the device 100, or the like.

As described above, the trusted component 120 may provide secure storage of various information. For example, the trusted component 120 may include a secure storage for storing authentication credentials, reference integrity metrics such as trusted reference values, sensitive data, or any other suitable sensitive information. According to one embodiment, the sensitive data may include security sensitive functions including keys, cryptographic algorithms, or any other suitable sensitive function or data.

The trusted component 120 may further provide cryptography including, for example, encryption, decryption, signature creation and validation, and hash calculation. For example, the trusted component 120 may perform cryptographic functions such as device authentication or other security-sensitive functions including symmetric key based encryption and decryption, asymmetric key based encryption and decryption, hash-value generation and verification, random number generation, and generation and verification of digital signatures. Additionally, the trusted component 120 may provide random number generation that may include pseudo random number generation (PRNG) such that the trusted component 120 may provide for the protection and generation of the PRNG values such as seed, periodicity, or like. As described above, the trusted component 120 may also provide a secure storage that may have security sensitive functions and data stored therein that may be used in cryptography such as keys or cryptographic algorithms.

In one embodiment, the trusted component 120 may provide time stamping including, for example, a secure and reliable time stamping of messages and data, cryptographically signed stamps, or the like. The trusted component 120 may also provide protection for an integrity of a component in the device 100 that may provide a measure of real time such as a real time clock.

The trusted component 120 may protect functions such as software executables including instructions and data by separating the functions and data from the rest of the device 100 and protecting the functions and data from unauthorized access and tampering. Additionally, the execution of functions within the trusted component 120 including data produced by the functions may be inaccessible to external entities such as other components that may not be trusted. The data such as security critical or sensitive data may be stored in, for example, the secure storage within the isolated environment provided by the cryptographic boundaries of the trusted component 120 and may be protected from outside probing through user-accessible buses and interfaces. The trusted component 120 may also enable an extraction of security parameters through controlled access ports using extraction policies and data that may be defined in advance.

The trusted component 120 may further include a trustworthy unique identity (ID) that may be bound to an identity of the device 100 and may be used interchangeably with the identity of the device 100. The trustworthy unique ID may be public and may be associated with a secret, such as a secret key, which may be known only to the trusted component 120 and may not be revealed outside of the trusted component 120. The trustworthy unique ID may be used to, for example, sign messages as a public key of a key pair. According to an example embodiment, the trustworthy unique ID may be provided by a creator of a key pair which may not be the same entity as a creator of the identity of the device 100. Therefore, in one embodiment, a mapping between the such identities may be provided based on the trustworthy unique ID being bound, for example, physically and logically to the identity of the device 100. For example, the trustworthy unique ID and associated secret key may be pre-provisioned by the manufacturer as part of a root of trust and may be associated with a certificate as described below with respect to FIG. 3.

In one embodiment, the trusted component 120 may securely store a hosting party module (HPM) ID. The HPM ID may be transferred to the trusted component 120 for binding and authenticating the device 100 and a hosting party module (HPM). The HPM ID storage may be configured based on a policy or rule such as an operator policy. The trusted component 120 may provide additional security functions and algorithms for associating the trusted component 120 to the HPM, or for associating the trusted component 120 with HPM data that may be configured by an operator or user. Thus, according to an example embodiment, the trusted component 120 may enable the device 100 to authenticate a hosting party and may provide evidence of the binding between the credentials and the entities involved in the authentication of the device 100 as well as the authentication of the hosting party.

The trusted component 120 may further be provisioned with security-sensitive functions, cryptographic keys, and other credentials that may relate to the identity of the device 100. According to an example embodiment, the trusted component 120 may be provided with the security-sensitive functions, cryptographic keys, and other credentials such as a device identity and a secret key associated with the device identity that may be used for cryptographic operations using a secure, out-of-band process such that the trusted component 120 may be configured to securely authenticate an identity of one or more components and to authorize external entities or components using standardized protocols. Thus, in one embodiment, external entities may be able to validate the trustworthy unique ID or the identity of the device 100 as belonging to a valid and authorized trusted component 120.

According to an example embodiment, the trusted component 120 may provide for operator configurable function isolation where software executables data and hardware functions may be separated from each other. Additionally, secondary identities for such functions may be embedded in the trusted component 120 based upon authentication with a network such as the network 104 capable of verifying the trusted component 120 through standardized secure protocols. In one embodiment, the trusted component 120 may download additional operator configurable functions after the device 100 may be deployed.

The trusted component 120 may further include one or more interfaces such as that may be initialized in a secure start-up process such as a secure boot, which will be described in more detail below. According to an example embodiment, the one or more interfaces may include unprotected interfaces. The unprotected interface may facilitate communication between the trusted component 120 and the general resources or components of the device 100. The unprotected interfaces may also provide access to data that may be cryptographically protected by the trusted component 120 and that may not be stored in the secure storage.

The one or more interfaces may also include protected interfaces. The protected interfaces may provide protection of an integrity and confidentiality of data carried between various components or modules in the trusted component 120. For example, in one embodiment, the protected interfaces may use security protocols that may provide encrypted communication between the various components that may be using the protected interfaces. The security protocols may include security-wise measures such as authentication of the component with which the trusted component 120 may be communicating as well message authentication and confidentiality.

Figure 3:
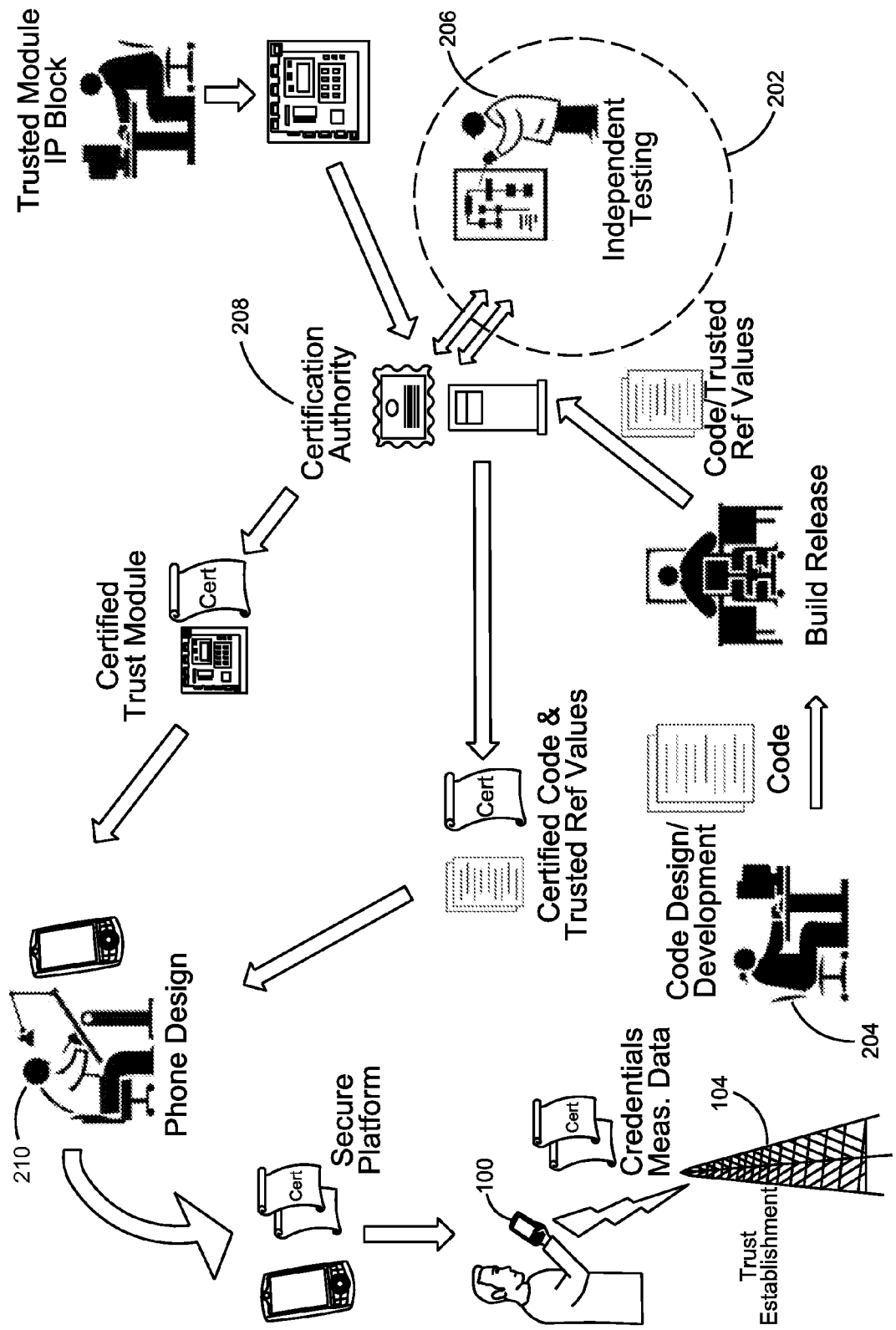
FIG. 3 illustrates an example embodiment of a method of establishing a trusted component that may be included in a device.

FIG. 3 illustrates an example embodiment of a method of establishing a trusted component that may be included in a device. As described above, a trusted component such as the trusted component 120 may be included in the device 100 of FIG. 2. According to an example embodiment, the trusted component 120 may be used to verify or attest to the trustworthiness of the device 100 to an external entity such as the network 104. Such a verification may include validating the chain of trust such as a supply chain as well as operational functions and/or applications of the device 100.

In an example embodiment, the trusted component 120 may provide a hardware based root of trust and a trusted environment for the device 100, and may be tested by an independent trusted third party 202 for security and functionality. The trusted component 120 may then be certified by the trusted third party 208 based on the testing. According to an example embodiment, the certification may be delivered using a digital certificate that may be communicated to any external communication entity such as the network 104 with which the device 100 may attach to attest to certification of the device 100.

Additionally, development tools 204 may be used to develop code and data images that may incorporate a trusted reference value such as a digest or hash of the code and data components of an executable code image. According to an example embodiment, the trusted reference value may be used to verify the integrity of the code included in the device 100 and may detect compromised code or data.

A code image may be further certified by the trusted third party 208 and may be delivered with a digital certificate which may be communicated to any external communication entity such as the network 104 with which the device 100 may attach to attest to certification of the device 100.

As shown in FIG. 3, an independent tester 206 may test the trusted component 120 and code for security feature and functionality and may provide input to a certificate authority (CA) 208 to produce a digital certificate for the trusted component 120 and code image.

A device manufacturer 210 such as a wireless device manufacturer may then incorporate the trusted component 120 in a design and may load the certified code image. For example, the device manufacturer 210 may receive the trusted component 120 and the certified code and trusted reference values. The device manufacturer 210 may then create a device such as the device 100 that may include the trusted component 120 as well as the certified code and trusted reference values.

When the device 100 attaches to, for example, the network 104, the device 100 may report or provide the certificate for the trusted component 120 and code image, as well as various integrity measurements, to the network 104 to validate the device 104 with the network. For example, the network 104 may verify that the device 100 may be trustworthy such that the network 104 may enable the device 100 to establish a communication link to the network 104.

Figure 4:
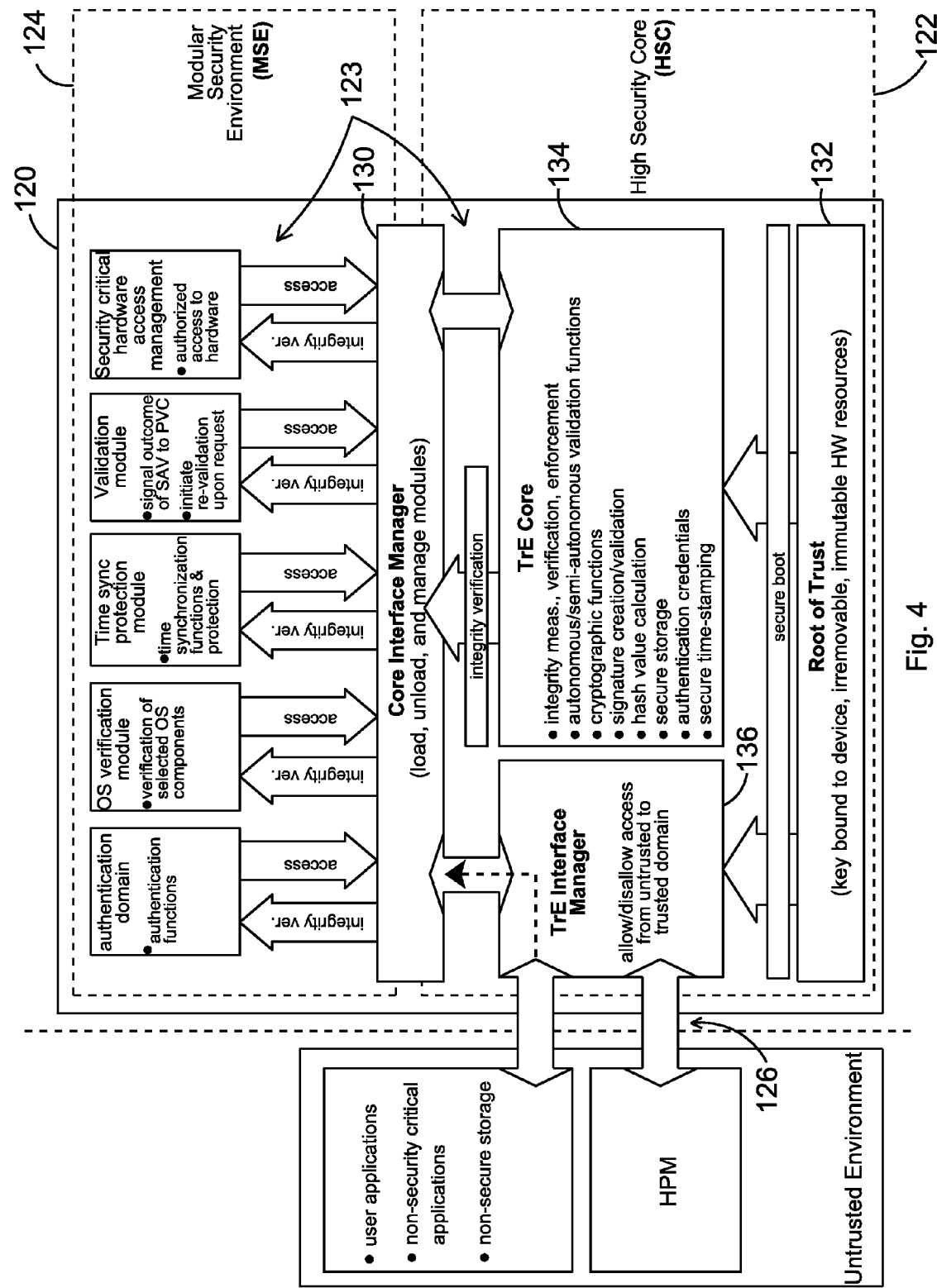
FIG. 4 illustrates an example embodiment of a trusted component that may be included in a trustworthy environment of a device.

FIG. 4 shows an example embodiment of a trusted component 120 that may be included in a trustworthy environment of, for example, the device 100. According to one embodiment, the device 100 may include the trusted component 120 as well as other components that may not be part of the trustworthy environment. For example, as described above, the trusted component 120 may include a logically separate entity as well as a set of functions and resources within the device 100 such that the trusted component 120 may provide a trusted environment for integrity or trust state protection, secure storage of, for example, sensitive data, cryptography, time stamping, secure execution of software, or the like. In particular, the trusted component 120 may include a high security core (HSC) 122, a modular security environment (MSE) 124, a trusted interface 126, a core interface 128, and a core interface manager (Core IFM) 130 as shown in FIG. 4. While the embodiment of the trusted component 120 illustrated in FIG. 4 is representative of one implementation in a Home Node-B device, it is understood that the implementation is not so limited and that the trusted component 120 may be implemented in any computing device with wired or wireless communication capabilities as discussed above.

According to an example embodiment, the HSC 122 may include a root of trust 132, a trusted core 134, and a trusted interface manager (TrE IFM) 136. The root of trust 132 may be accessible to the device 100, the trusted component 120, and the HSC 122. According to one embodiment, the root of trust 132 may include a set of immutable, irremovable hardware resources that may be bound physically to the device 100 such that the root of trust 132 may ensure an integrity of the trusted core 134 and/or the trusted interface manager 136 during a secure start-up process such as a secure boot of the device. For example, the root of trust 132 may be a write protected read only memory (ROM) unit that may include functionally similar to a smart phone basic input/output system (BIOS). The root of trust 132 may also securely store information for validation or verification of, for example, the trusted component 120. For example, the root of trust 132 may secure store reference metrics such as a trusted reference value associated with the trusted component 120. According to an example embodiment, the root of trust 132 code may be encrypted and/or decrypted through a secure credential using, for example, the cryptography that may be included in the trusted component 120.

As described above, the HSC 122 may include the trusted core 134. According to an example embodiment, the trusted core 134 may provide one or more functions for the trusted component such as integrity measurement, verification, reporting and enforcement, autonomous or semi-autonomous validation; cryptographic functions such as encryption and decryption, signature creation and validation, and hash value calculation; functions for a secure time-stamping of validation data; or the like. The trusted core 134 may also provide a secure storage of secrets, keys, reference metrics such as trusted reference values associated with components that may be used for validation or verification, authentication credentials such as a device identity and a secret key associated with the device identity that may be used for cryptographic operations, or any other information or data. In one embodiment, an extended secure start-up process such as a secure boot may be enforced by the trusted core 134, which will be described in more detail below.

The trusted interface manager 136 may manage, for example, the trusted interface 126 that may provide communication between the trusted component 120 and other components of the device 100. According to an example embodiment, the trusted interface manager 136 may manage the trusted interface 126 based on one or more policies.

The trusted component 120 may also include a core interface manager 130. The trusted core interface manager 130 may manage the core interface 128 that may provide communication between the HSC 122 and the MSE 124 and may also provide communication between the trusted interface manager 136 and the trusted core 134. For example, the trusted core interface manager 130 may control access to the trusted core 134 and associated resources and may load executable modules such as software and associated data into the MSE 124 as described above. According to an example embodiment, the trusted component 120 may be included in the HSC 122. Additionally, an integrity of the core interface manager 130 may be protected and/or verified by the extended secure start-up process that may be enforced by the trusted core 134. The core interface manager may also start the HSC 122 and/or the MSE 124 upon verification via the extended secure start-up process.

The HSC 122 may also include physical components such as cryptographic units, the root of trust 132, physically secured storage, or the like that may be bound to the device 100. According to one embodiment, the physical components and physically secured storage may include a separate, hardened hardware unit. The physical components may also be protected against physical attacks such as simple and differential power consumption analysis, probing, or the like. According to an example embodiment, such protection may be provided up to a degree that may be needed by a particular application. The HSC 122 may further include interfaces that may protect the data in the HSC 122 from unauthorized access or tampering and may control access to the trusted core 134. Thus, in an example embodiment, the security of the HSC 122 may be assured by the physical components, the physically secured storage, and the interfaces.

The MSE 124 may provide a trustworthy environment for execution of applications such as an operating system (OS) verification module, a time synchronization module, a validation module, or the like. For example, the core interface manager 130 may load the application modules that may be included in the device 100 into the MSE 124 based on one or more policies or rules. In one embodiment, each of the application modules that may be loaded may run in a protected environment in the MSE 124 that may be logically separate and isolated from other such environments. The trusted core 134 may also verify the integrity of a module via the core interface manager 130 before loading the module into the MSE 124.

According to an example embodiment, the MSE 124 may enable an extension of the trusted core 134 for applications such as security critical applications based on one or more policies or rules. The security of the MSE 124 may be assured by verifying an integrity of the loaded application via the trusted core 134 and the trusted interface manager 136 that may enable access control to the resources of the trusted component 120 to entities outside of the trusted component based on a security policy.

As described above, the trusted component 120 may be started securely via a secure start-up process such as a secure boot to ensure that the device 100 may be started in a predefined trustworthy state. In an example embodiment, the secure start up process such as the secure boot may include starting the HSC 122, MSE 124, the trusted interface 126, the core interface 128, and the core interface manager 130. Specifically, in one embodiment, the root of trust 132 may securely start trusted elements of an operating system (OS) such as a boot loader for the OS kernel. According to one embodiment, the boot loader may include an indication of the code and/or components being loaded for execution and whether an integrity of the code and/or components being loaded may have been verified. For example, the boot loader may include a list of code and/or components that may have been loaded into memory including, for example, whether the integrity of the code and/or components may have been verified such that the boot loader may be used to know what code and/or component may be required to be loaded and integrity verified thereof.

The root of trust 132 may also securely start the trusted core 134 via, for example, a secure boot such that the trusted core 134 may start other components of the trusted component 120 including the HSC 122 or the MSE 124.

The secure start up process such as the secure boot may include measuring the integrity, or verifying the trust state, of each component or element before the component or element may be started. For example, measured integrity values may be compared to predetermined reference metrics such as the trusted reference values to determine whether the measured integrity values match the predetermined reference metrics. In an example embodiment, the predetermined reference metric(s) for a component may have been obtained by, for example, computing a hash over the component using a particular hash algorithm. Later, to ensure the integrity of that component during the secure start up process, that same hash algorithm may be employed by the device to again compute a hash over the component. The new hash defining the measured integrity values. According to an example embodiment, when the measured integrity values match the predetermined reference metrics, the integrity of a component may be verified and the component may then be started. Alternatively, when the measured integrity values do not match the predetermined reference metrics, the integrity of a component may not be verified and, thus, the component may not be started. The secure start up process may further include using the trusted component 120 to securely start other components of device 100 including, for example, the operating system.

In one embodiment, the root of trust 132 may remain immutable and irremovable after the trusted component 120 including the components therein may have started via the secure start-up process such as the secure boot. If, however, the trusted core 134 may detect tampering with the device 100, the trusted core 134 may render itself and/or other components of the trusted component 120 inoperable.

Figure 5:
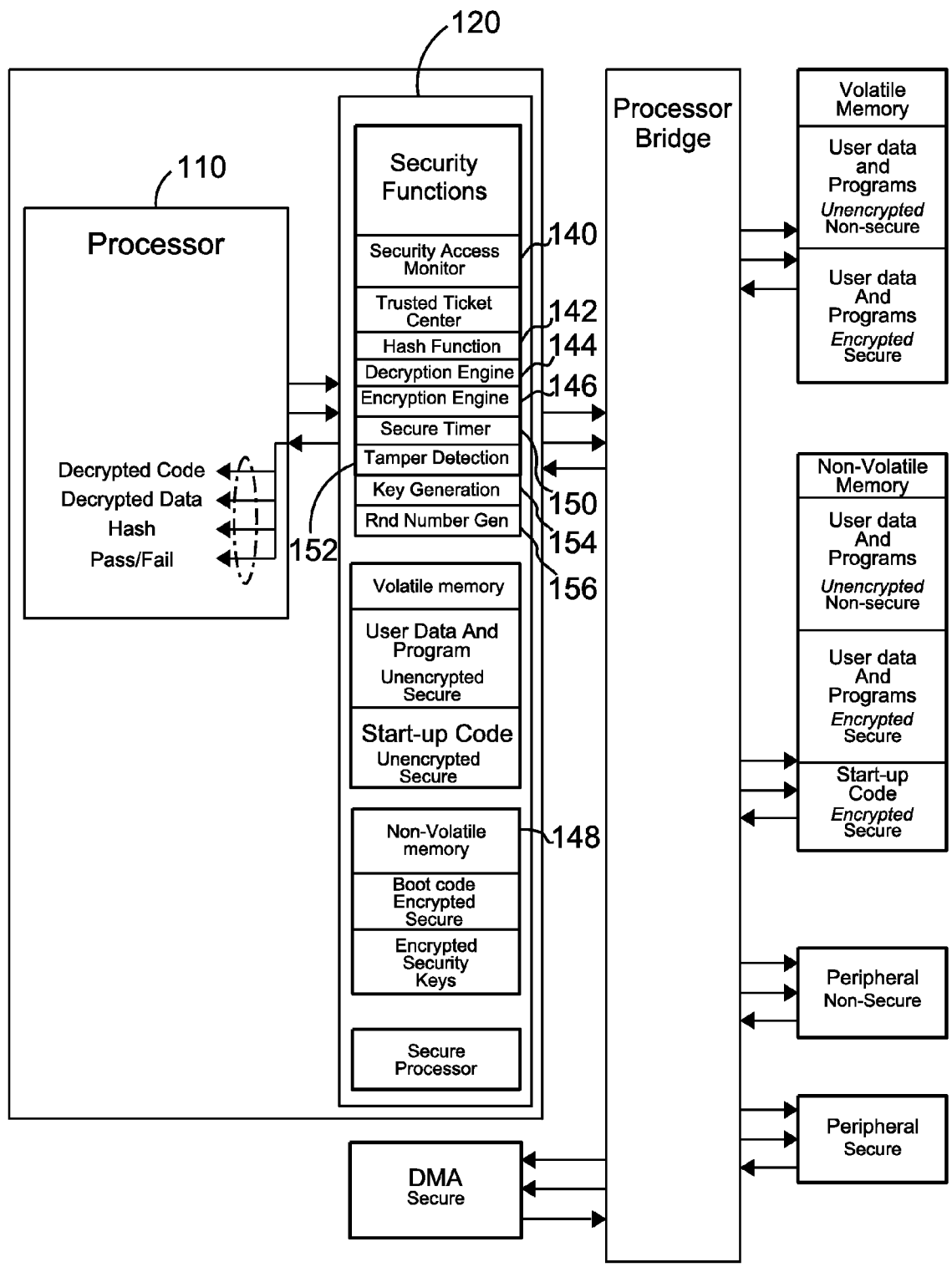
FIG. 5 illustrates an example embodiment of a trusted component in communication with one or more components in a device.

FIG. 5 illustrates an example embodiment of a trusted component in communication with one or more components in a device. As shown in FIG. 5, according to other example embodiments, the trusted component 120 may include a security access monitor 140. The security access monitor 140 may be a gateway to hardware and/or software components that may be included in the trusted component 120 and hardware and/or software components that may be external to the trusted component 120.

According to an example embodiment, the security access monitor 140 may be similar to a memory management unit (MMU) that may be responsible for providing chain based and/or real-time integrity verification. The security access monitor 140 may further allow or deny access to memory, may allow or deny access to direct memory access (DMA), may allow or deny access to peripherals, may define security protection features used for hardware and software, may identify trusted memory contents, may provide dynamic real-time address re-mapping, and/or may provide state based access control. In one embodiment, the security access monitor 140 may include a security access table that may be used to control access to memory, peripherals, or the like and may be used during chain based and/or real-time integrity verification, which will be described in more detail below.

The trusted component 120 may also include a hash function 142. For example, the trusted component 120 may execute a hash function 142 on code or instructions that may be executed to verify components, data, or the like, before such code or instructions, components, data, or the like may be accessible as described above. In example embodiments, the hash function 142 may support combinations of hash algorithms including, for example, a MD5 algorithm and Secure Hash Algorithm (SHA), such as SHA-1, SHA-256, SHA-512, or other SHA based algorithms.

The hash function 142 may also process data provided by the security access monitor 140 and may generate a signature or hash of the data. According to one embodiment, the generated signature or has may be compared to an expected trusted reference metric or value (i.e., a previously computed hash) for verification that may be, for example, stored in a component of the trusted component 120 such as a the security access monitor 140, which will be described in more detail below. For example, an integrity of the software code or instructions, components, data, or the like may be verified by comparing the generated signature or resulting hash value provided by, for example, the hash function 142 with, for example, a reference hash value or expected trusted reference value such as a predetermined reference metric. If the signatures or hash values may not match, the software code or code or instructions, components, data, or the like may have been tampered with.

As shown in FIG. 5, the trusted component 120 may further include a decryption engine 144 and an encryption engine 146. According to an example embodiment, the decryption engine 144 may decrypt code or instructions that may be used, for example, to verify an integrity of one or more components of the device 100. The decryption engine 144 may also decrypt data from, for example, components of the device such as components that may be external to the trusted component 120 that may be used by a processor 110 or stored in, for example, secure memory 148. In an example embodiment, the encryption engine 146 may provide confidentiality and integrity protection such as encryption using one or more encryption algorithms such as Advanced Encryption Standard (AES) and Data Encryption Standard (DES) for code or instructions and data that may be stored in the secure memory 148 and/or provided to one or more components that may be external to the trusted component 120.

The trusted component may further include a secure timer 150 and a tamper detection component 152. The secure timer 150 may provide a real-time clock that may be used for time keeping functions such as secure time based protocols or timed access control. The secure timer 150 may also be used to verify secure timing, improper functionality, possible insecure tampering, or protect a processor from, for example, freezing or hanging.

According to an example embodiment, the tamper detection component 152 may detect and report insecure or unauthorized access or tampering with components of the device 100. For example, the tamper detection component 152 may include dedicated units. The dedicated units may include a series of modules that may be included in the trusted component 120 that may detect and report possible insecure access or tampering of hardware or software and data. According to example embodiments, the tamper detection component 152 may include temperature measurement, clock integrity measurement, voltage measurement, key protection, or the like.

As shown in FIG. 5, the trusted component 120 may include a key generator 154 and a random number generator 156. According to an example embodiment, the key generator 154 may generate and/or provide a security key that may be used by, for example, the decryption engine 144 and/or encryption engine 146 to decrypt and/or encrypt code or instructions and data. Similarly, the random number generator 156 may be used to generate and/or provide random numbers or values that may be used during authentication of, for example, one or more components of the device 100 and/or generation of the key by, for example, the key generator 154.

According to an example embodiment, the trusted component 120 may also be used to isolate secure code and data including boot code, start-up code, trusted ticket center code, encrypted user programs and/or data, or the like from non-secure components such as non-secure hardware or software. For example, the security access monitor 140 may be used to isolate or control access to secure code and data. The security access monitor 140 may also be used to control access to secure peripherals and direct memory access (DMA) blocks.

Figure 6:
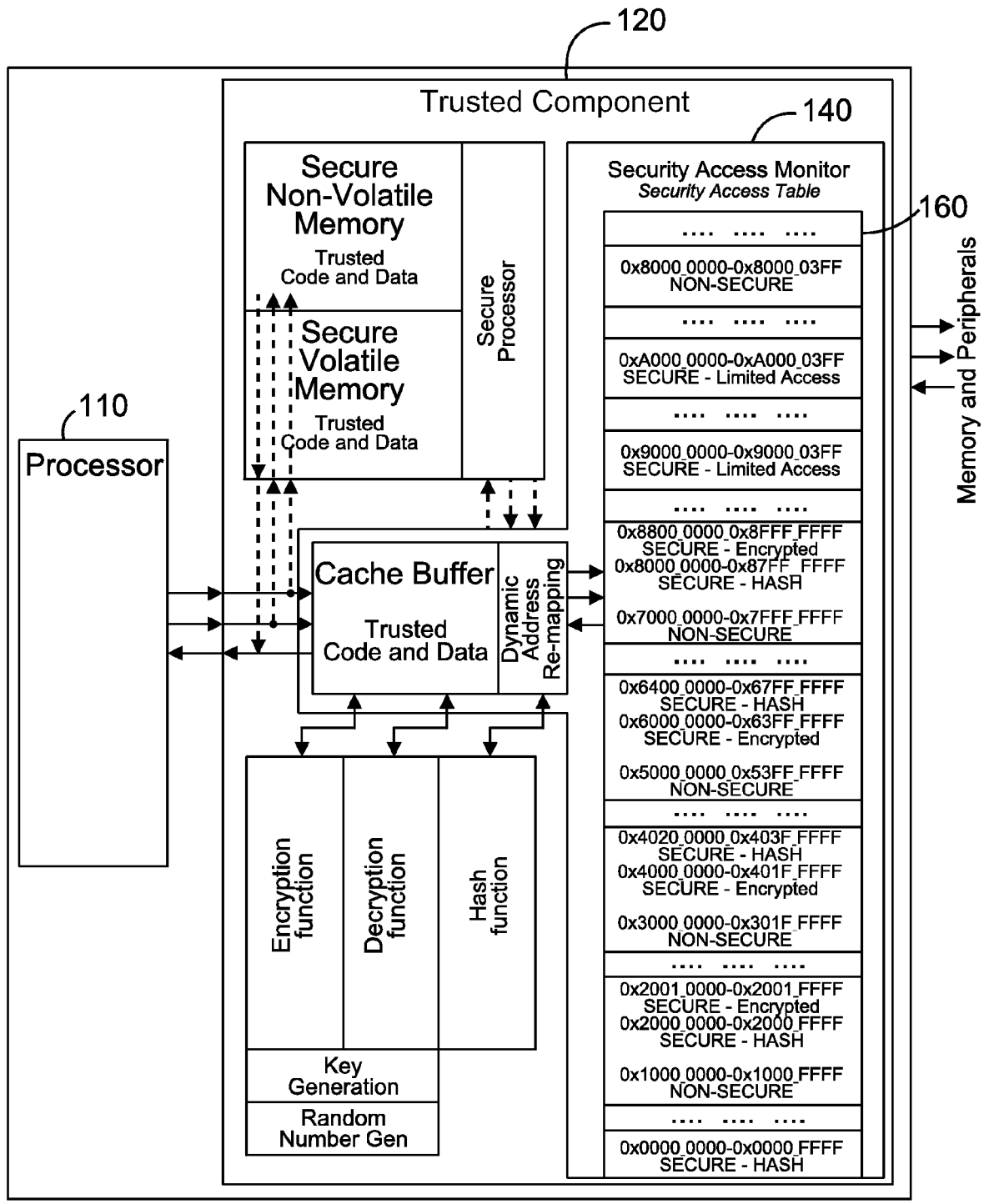
FIG. 6 illustrates an example embodiment of a security access monitor and a security access table that may be included in a trusted component.

FIG. 6 illustrates an example embodiment of a security access monitor and a security access table that may be included in a trusted component. For example, as described above, the security access monitor 140 may include a security access table 160 that may be used to determine the integrity of one or more components of the device 100. For example, in one embodiment, the security access table 160 may include expected trusted reference values or predetermined reference metrics such as predetermined or stored hash values that may be computed over the one or more components of the device. As described above, in one embodiment, the trusted component 120 may compare a generated signature or measurement for a component with the expected trusted reference values or predetermined reference metrics to determine whether the signature or measurement match the expected values or predetermined metrics. If, the signature or measurements match the expected values or predetermined metrics, an integrity of the component may be verified.

According to an example embodiment, when the device 100 may be started or re-booted, the security access monitor 140 may verify addressable contents and internal components and/or contents of the trusted component 120 may be verified for integrity. Upon verifying the integrity, the processor 110 may begin to execute boot read only memory (ROM) code that may include a hardened ASIC hardware and/or software that may not be altered. In an example embodiment, the hardened ASIC hardware and software may provide the root of trust 132 for the trusted component 120.

Figure 7:
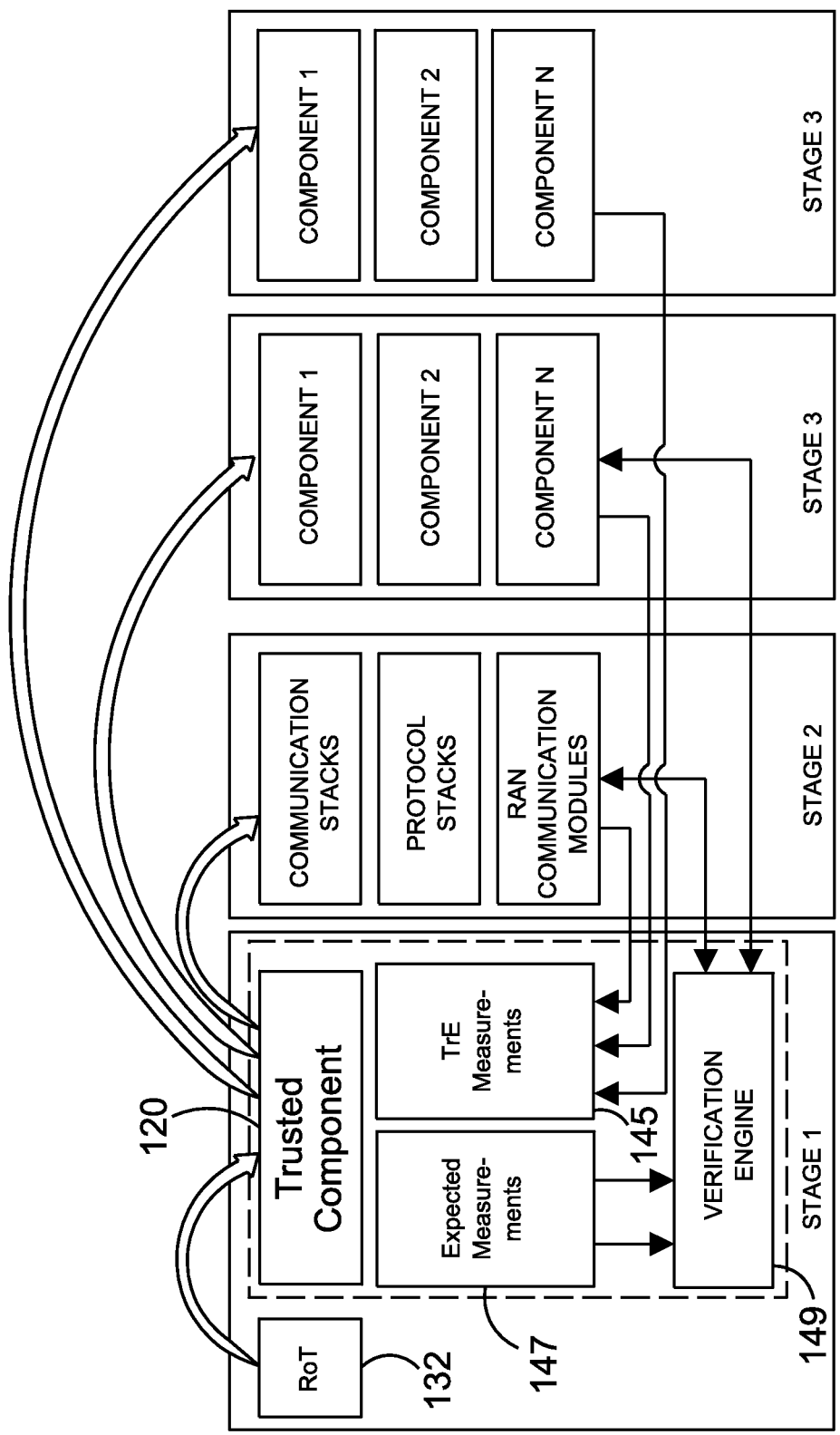
FIG. 7 depicts an example embodiment of a method of a validating components in a device through a secure start-up.

FIG. 7 depicts an example embodiment of a method of a validating components in a device such as the device 100 through a secure start-up. As shown in FIG. 7, the secure start-up of the device may proceed from a root of trust such as the root of trust 132 to a full functional state in multiple stages by building a chain of trust. In Stage 1, the trusted component 120 may be built from the root of trust 132 in a secure start-up such as a secure boot. For example, the root of trust 132 may be configured to verify an integrity of the trusted component 120 via the secure boot. If the integrity of the trusted component 120 may not be verified in Stage 1, the root of trust 132 may operate in accordance with a first policy. For example, the root of trust 132 may prevent or restrict access to credentials such as a device identity and a secret key associated with the device identity that may be used for cryptographic operations including device authentication or may restrict or prevent access to other information stored in the trusted component 120 and/or the device 100 to external components. Additionally, if the integrity of the trusted component 120 may not be verified in Stage 1, the secure start-up may stop and other components in the device 100 may not be verified in the subsequent stages.

Alternatively, if the integrity of the trusted component 120 may be verified in Stage 1, the root of trust 132 may operate in accordance with a second policy. For example, the root of trust may pass control to the trusted component 120. The trusted component 120 may then perform Stage 2 of the secure start-up. According to an example embodiment, in Stage 2, the trusted component 120 may verify, load, and start further components that may be essential to operation of the device 100. For example, in Stage 2, the trusted component 120 may verify an integrity of communication stacks, protocol stacks, and/or network communication modules. The trusted component 120 may then load and start each of the components such as the communications stacks, protocol stacks, and/or network communications modules that may have a verified integrity. According to an example embodiment, if the integrity of the communication stacks, protocol stacks, and/or network communications modules may not be verified in Stage 2, the device 100 may operate in accordance with the first policy and/or any other suitable policy that may be defined.

If the integrity of the essential components may be verified in Stage 2, the trusted component 120 may then perform Stage 3 of the secure start-up. According to an example embodiment, in Stage 3, the trusted component 120 may verify, load, and start further components. For example, in Stage 3, the trusted component 120 may verify an integrity of applications, operating system components, other hardware components, or the like. The trusted component 120 may then load and start each of the components such as the applications, the operating system components, the other hardware components, or the like that may have a verified integrity. According to an example embodiment, if the integrity one or more other components may not be verified in Stage 3, the device 100 may operate in accordance with the first policy and/or any other suitable policy that may be defined.

As shown in FIG. 7, according to an example embodiment, the components may be verified by the trusted component 120 by taking measurements or values 145, such as a hash, of each of the components and comparing such measurements or values with expected or predetermined trusted reference values or measurements 147 that may be stored in the device 100 via a verification engine 149. According to an example embodiment, the expected or predetermined trusted reference values or measurements 147 may be securely provisioned or supplied in certificates that may be digested and stored in the device 100. If the measurements or values of a component match the expected or predetermined trusted reference values or measurements or certificate associated with the component, the integrity of the component may be verified. If, however, the measurements or values of a component do not match the expected or predetermined measurement or certificate associated with the component, the integrity of the component may not be verified.

Figure 8:
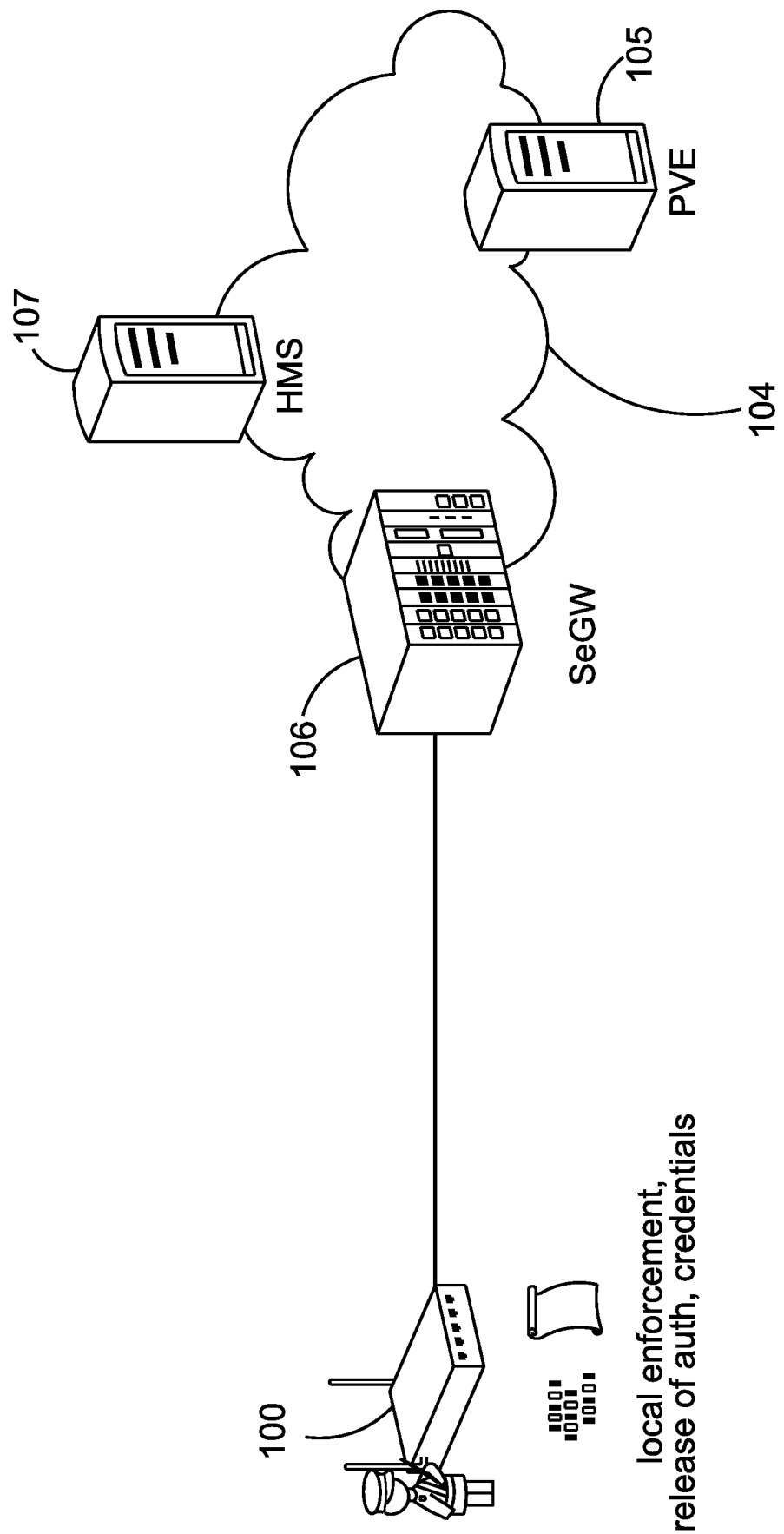
FIG. 8 illustrates an example embodiment of autonomous validation of a device.

FIG. 8 illustrates an example embodiment of autonomous validation of the device 100. According to one embodiment, the autonomous validation of the device 100 may be executed or performed during start up of the device 100. For example, the device 100 may directly evaluate the measurements to verify an integrity of one or more of the components of the device 100 such that the components that may not be verified may not be started as described above. According to one embodiment, access to secure data, secure functions, or the like may also be prevented when an integrity of one or more of the components in the device 100 may not be verified as described above. Additionally, the device 100 may not be authenticated with the network 104 when an integrity of one or more of the components of the device 100 may not have been verified such that the device 100 may be prevented from connecting to the network 104 or the credentials that may be used to authenticate the device with the network may not be released by the trusted component.

Figure 9:
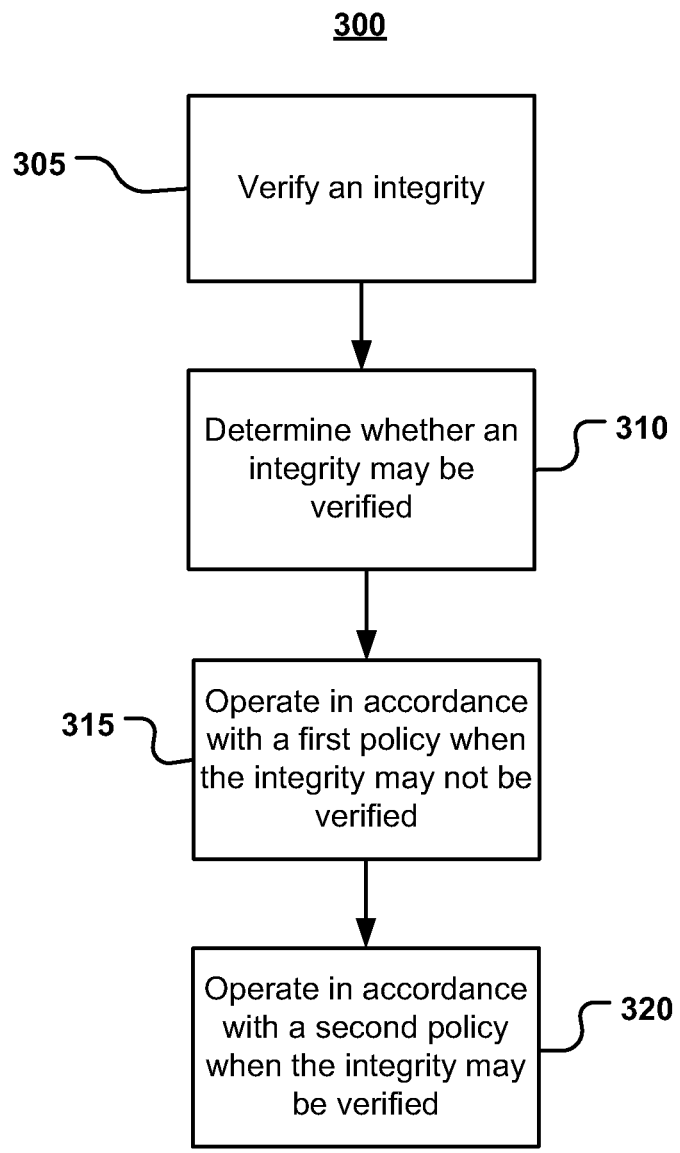
FIG. 9 depicts a flow diagram of an example method for autonomous validation of a device.

FIG. 9 depicts a flow diagram of an example method 300 for autonomous validation of the device 100. As shown in FIG. 9, at 305, an integrity of the trusted component 120 may be verified by, for example, the root of trust 132 as described above. According to an example embodiment, the integrity of the trusted component 120 may be verified as part of a staged secure boot that may be initiated by the root of trust 132.

At 310, a determination may then be made regarding whether an integrity of the trusted component 120 may be verified. For example, as described above, the root of trust 132 may evaluate the measurements to verify the integrity of the trusted component 120 by comparing a measurement of the trusted component 120 with a trusted reference value associated with the trusted component 120 that may be stored in, for example, the root of trust 132. According to an example embodiment, the determination may be made as part of the staged secure boot that may be initiated by the root of trust 132.

At 315, the device 100 may operate in accordance with a first policy when the integrity of the trusted component 120 may not be verified. For example, the first policy may restrict and/or prevent access to information included in the trusted component 120. Thus, in one embodiment, access to information that may be used to authenticate, for example, the device 100 with the network 104 may be prevented when the integrity of the trusted component may not be verified.

At 320, the device 100 may operate in accordance with a second policy when the integrity of the trusted component 120 may be verified. For example, as described above, when the integrity of the trusted component 120 may be verified, the root of trust 132 may pass control to the trusted component 120 to verify other components in the device 100 as defined by the second policy. Thus, for example, the device may be permitted to operate as intended, such as to authenticate itself with an external communication entity, such as a network, to enable the device to communicate with the external communication entity.

FIGS. 10-11 illustrate example embodiments of remote validation of a device 100. For example, the device 100 may establish an initial connection to, for example, the security gateway 106 of the network 104. According to one embodiment, the device 100 may provide measurements associated with one or more components included in the device 100 to the network 104 via the connection to the security gateway 106.

The network 104 using, for example, the PVE 105 may then evaluate the received measurements against predetermined reference metrics such as trusted reference values by, for example, comparing the received measurements with the predetermined reference metrics as described above to determine whether one or more exceptions may be encountered including whether an integrity of one or more components in the device 100 may not be verified based on the comparison. In one embodiment, if one or more exceptions may be encountered, the network 104 may deny access to the device 100. According to another embodiment, the network 104 may grant the device 100 limited network access or quarantined access if one or more exceptions may have been encountered. The network 104 may further provide a request to the device 100 to perform one or more remedial measures if one or more of the exceptions may be errors relating to a non-core component, that is a component that is not critical to the basic functioning of the device. For example, the device 100 may revert to a predetermined state in response to the remedial request.

Figure 12:
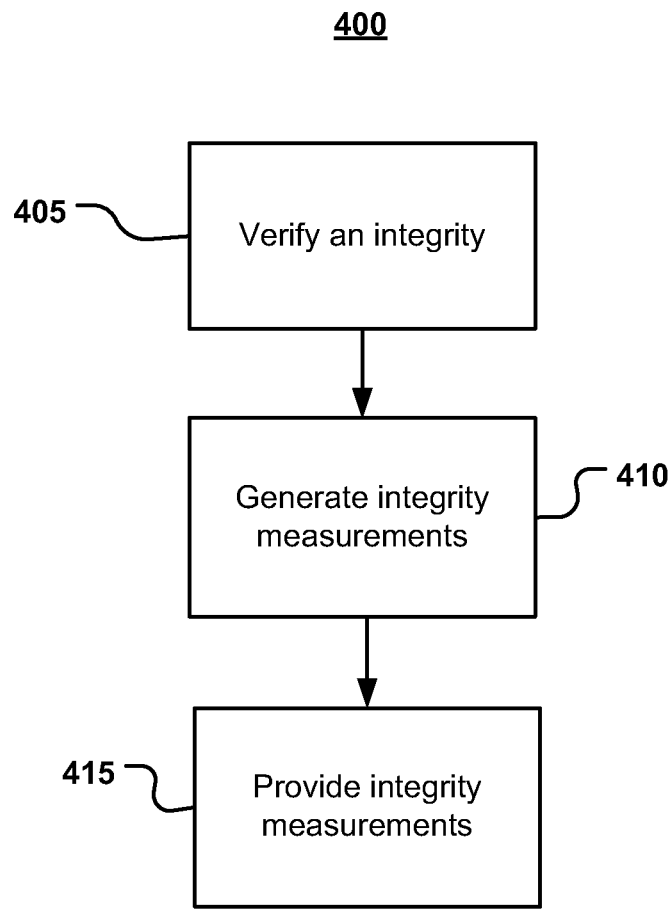
FIG. 12 depicts a flow diagram of an example method for remote validation of a device.

FIG. 12 depicts a flow diagram of an example method 400 for remote validation of the device 100. As shown in FIG. 12, at 405, an integrity of the trusted component 120 may be verified by the root of trust as described above.

At 410, integrity measurements, such as hash computations, may then be generated by the trusted component 120 for other components in the device 100.

At 415, the integrity measurements may be provided by, for example, the trusted component 120 to the network 104 for validating the device 100 with the network 104. As described above, the network 104 using, for example, the PVE 105 may then evaluate the received measurements against predetermined reference metrics by, for example, comparing the received measurements with the predetermined reference metrics as described above to determine whether one or more exceptions may be encountered including whether an integrity of one or more components in the device 100 may not be verified based on the comparison.

Figure 13:
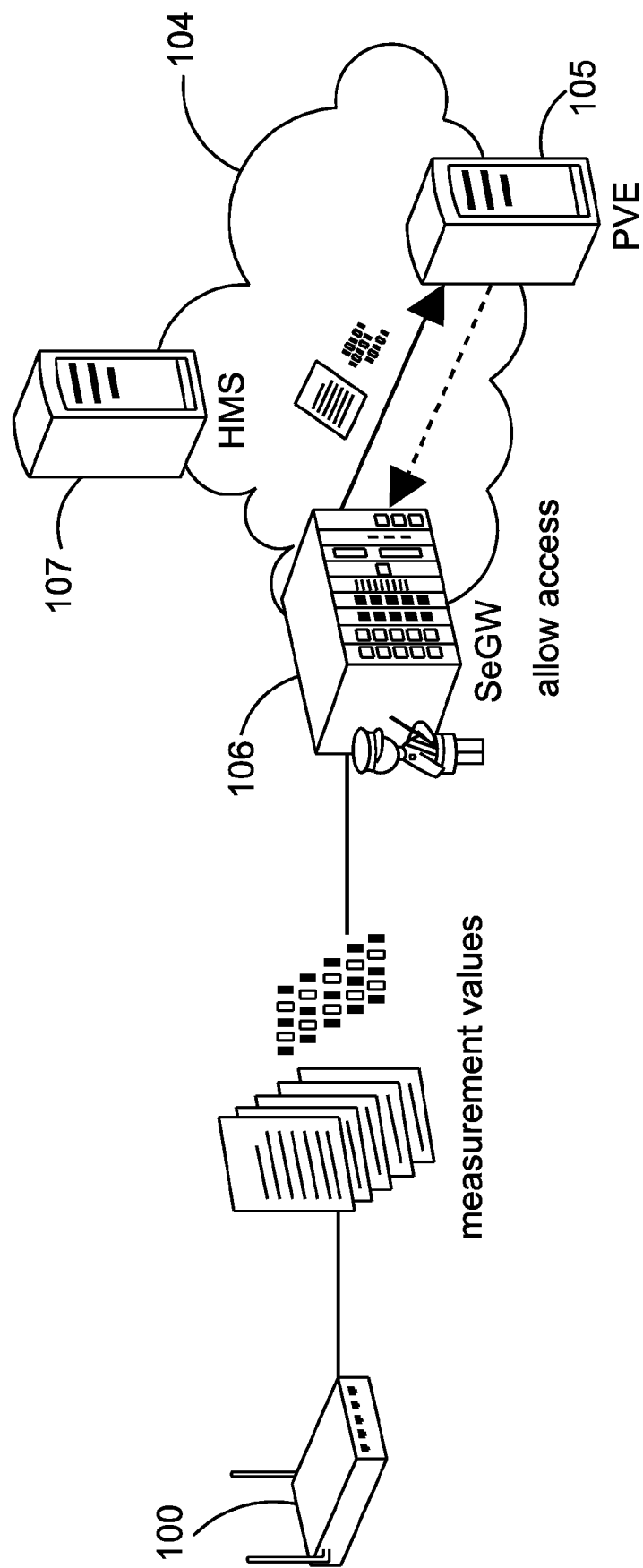
FIG. 13 illustrates an example embodiment of semi-autonomous validation.

FIG. 13 illustrates an example embodiment of semi-autonomous validation. For example, the device 100 may evaluate trust state measurements as described above and may store the results of the evaluation of the measurements. The device 100 may then establish an initial connection to, for example, the security gateway 106 of the network 104. According to one embodiment, the device 100 may provide the results of the evaluation to the network 104 via the connection to the security gateway 106. The device 100 may also provide a subset of the measurements to the network 104 via the connection to the security gateway 106. Additionally, according to an example embodiment, the device 100 may evaluate and provide the measurements in response to a request from the network 104.

The network 104 may then make fine grained access control decisions based upon integrity measurement results of one or more components in the device 100. For example, the network 104 may then determine one or more exceptions during the evaluation such as whether an integrity of one or more components in the device 100 may not have been verified using, for example, the PVE 105. In one embodiment, if one or more exceptions may have be encountered, the network 104 may deny access to the device 100. According to another embodiment, the network 104 may grant the device 100 limited network access or quarantined access if one or more exceptions may have been encountered. The network 104 may further provide a request to the device 100 to perform one or more remedial measures if one or more of the exceptions may be non-core component verification errors. For example, the device 100 may revert to a predetermined state in response to the remedial request.

While the various embodiments have been described in connection with the preferred embodiments of the various figures, it is to be understood that other similar embodiments may be used or modifications and additions may be made to the described embodiment for performing the same function of the various embodiments without deviating there from. Therefore, the embodiments should not be limited to any single embodiment, but rather should be construed in breadth and scope in accordance with the appended claims.

Additionally, it should be understood that the various techniques described herein may be implemented in connection with hardware or software or, where appropriate, with a combination of both. Thus, the methods and apparatus of the subject matter described herein, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable computing devices (which program code may be pre-stored in the device or communicated securely to the device through remote device management protocols, such as OMA DM or TR069), the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

What is claimed:

1. A device capable of being authenticated with an external communication entity, the device comprising:
    credentials used for cryptographic operations;
    a trusted component, the trusted component comprising a secure storage, the secure storage containing the credentials;
    a root of trust comprising a set of immutable hardware resources;
    at least one essential component, the at least one essential component being essential to the operation of the device; and
    at least one non-essential component of the device,
    wherein during a first stage of a secure startup, the root of trust attempts to verify an integrity of the trusted component, the root of trust preventing access to credentials and stopping the secure startup when the trusted component is not verified by the root of trust, the root of trust passing control of the secure startup to the trusted component when the integrity of the trusted component is verified by the root of trust,
    wherein during a second stage of the secure startup under the control of the trusted component, the trusted component attempts to verify an integrity of the at least one essential component, the trusted component preventing access to credentials and stopping the secure startup when the at least one essential component is not verified by the trusted component, the trusted component proceeding with a third stage of the staged startup when the integrity of the at least one essential component is verified by the trusted component, and
    wherein during the third stage of the secure startup under the control of the trusted component, the trusted component attempts to verify an integrity of the at least one non-essential component, the trusted component preventing the at least one non-essential component from starting when the at least one non-essential component is not verified by the trusted component, the trusted component starting the at least one non-essential component when the at least one non-essential component is verified by the trusted component.

2. The device of claim 1, wherein the essential components include a network communication module.

3. The device of claim 1, wherein the root of trust securely stores a trusted reference value associated with the trusted component.

4. The device of claim 3, wherein the root of trust is configured to compare a measurement of the trusted component with the trusted reference value associated with the trusted component, and wherein the integrity of the trusted component is verified when the measurement of the trusted component matches the trusted reference value associated with the trusted component.

5. The device of claim 1, wherein the at least one non-essential component is used by the device during operation in a trusted mode.

6. The device of claim 1, wherein the secure storage further stores a trusted reference value associated with the at least one non-essential component.

7. The device of claim 6, wherein the trusted component is configured to compare a measurement of the at least one non-essential component with the trusted reference value associated with the at least one non-essential component stored in the secure storage, and wherein the integrity of the at least one non-essential component is verified when the measurement of the at least one non-essential component matches the trusted reference value associated with the at least one non-essential component.

8. The device of claim 1, wherein the root of trust comprises a certificate associated therewith, and wherein the certificate reflects a verification of an integrity of the root of trust by a third party.

9. The device of claim 1, wherein the root of trust comprises a certificate associated therewith, and wherein the certificate reflects a verification of an integrity of the root of trust by a third party.

10. The method of claim 1, wherein the external communication entity is configured to restrict at least some access to the device if the integrity measurements do not match measurements expected by the external communication entity.

11. A method for validating one or more components in a device capable of being authenticated with an external communication entity, wherein the device comprises credentials used for cryptographic operations, a trusted component comprising a secure storage containing the credentials, a root of trust having a set of immutable hardware resources, at least one essential component being essential to the operation of the device; and at least one non-essential component of the device, the method comprising:

during a first stage of a secure startup, the root of trust attempting to verify an integrity of the trusted component, the root of trust preventing access to credentials and stopping the secure startup when the trusted component is not verified by the root of trust, the root of trust passing control of the secure startup to the trusted component when the integrity of the trusted component is verified by the root of trust;

during a second stage of the secure startup under the control of the trusted component, the trusted component attempting to verify an integrity of the at least one essential component, the trusted component preventing access to credentials and stopping the secure startup when the at least one essential component is not verified by the trusted component, the trusted component proceeding with a third stage of the staged startup when the integrity of the at least one essential component is verified by the trusted component; and during the third stage of the secure startup under the control of the trusted component, the trusted component attempting to verify an integrity of the at least one non-essential component, the trusted component preventing the at least one non-essential component from starting when the at least one non-essential component is not verified by the trusted component, the trusted component starting the at least one non-essential component when the at least one non-essential component is verified by the trusted component.

12. The method of claim 11, wherein attempting to verify the integrity of the trusted component comprises comparing a measurement of the trusted component with a reference value associated with the trusted component, wherein the integrity of the trusted component is verified when the measurement of the trusted component matches the trusted reference value associated with the trusted component.

13. The method of claim 11, wherein attempting to verify an integrity of the at least one non-essential component comprises comparing a measurement of the other component with a reference value associated with the other component, wherein the integrity of the other component is verified when the measurement of the other component matches the trusted reference value associated with the other component.

* * * * *